Feb. 20, 1962  M. M. MERLEN  3,021,749
AZIMUTH TRANSFER SYSTEM
Filed March 9, 1960  2 Sheets-Sheet 1

*INVENTOR.*
MONTY M. MERLEN
BY Robert Ames Norton
*ATTORNEY*

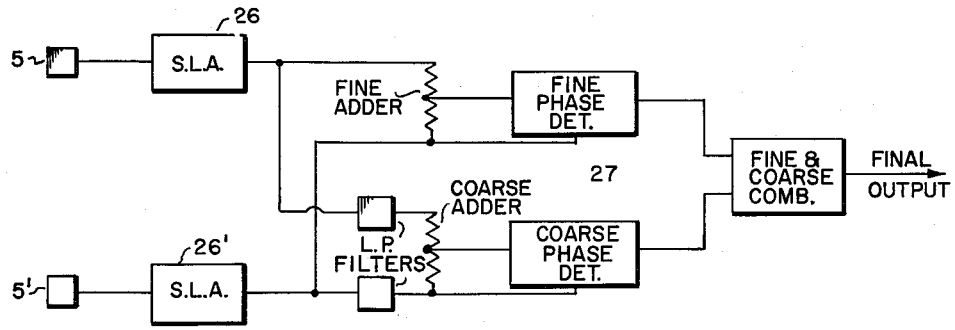
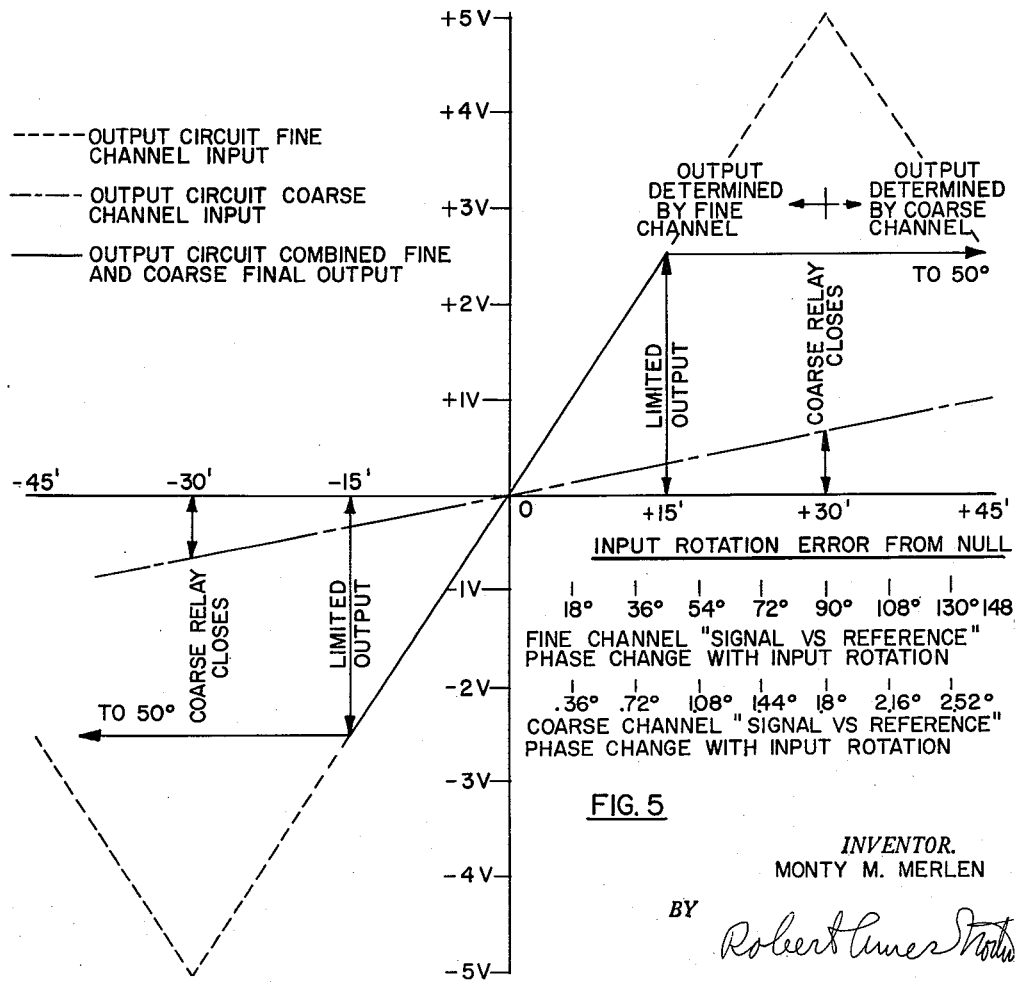

United States Patent Office 3,021,749
Patented Feb. 20, 1962

3,021,749
AZIMUTH TRANSFER SYSTEM
Monty M. Merlen, Stamford, Conn., assignor to Barnes Engineering Company, Stamford, Conn., a corporation of Delaware
Filed Mar. 9, 1960, Ser. No. 13,947
4 Claims. (Cl. 88—1)

This invention relates to an azimuth transfer system of extreme precision which is unaffected by translational movements over a wide range.

When it is necessary to transfer an azimuth at a considerable distance, for example, from the bottom of a tower to the top, serious problems are encountered. It is a practical impossibility to produce lengthy structures such as towers which are absolutely rigid or at least absolute rigidity of such tall structures can only be obtained at a prohibitive expense. On the other hand, there are a number of problems which require that the azimuth of a table or an instrument thereon at the top of a tower be precisely aligned with and stay aligned with an element on the ground. The tower may bend in the wind or warp slightly with changing temperature conditions and as a result the top of the tower may move through quite a distance translationally.

The present invention permits transfer of azimuth for long distances with extraordinary precision. For example, at the top of a 45' tower azimuth transfer can be obtained that is accurate to less than a tenth of a minute of arc and practically down even to as little as one second of arc when conditions are favorable as when the device, the azimuth of which is to be transferred at the top of the tower, is on a table which does not tilt seriously although it may be moved translationally to quite an extent.

The most important practical uses of the present invention involve azimuth transfer from the bottom of a tall structure such as a tower to the top. However, it should be understood that the same accuracy and insensitiveness to translational movements is obtained if the two elements are separated by long distances horizontally or even by an inclined structure. It will be apparent from the more detailed description below that the accuracy of the system and its operation is in no sense dependent on a vertical displacement. However, for clarity and simplicity the invention will be described in connection with a tower which is vertical it being understood that what is said applies, mutatis mutandis, to any structure regardless of whether it is vertical or horizontal.

Essentially the present invention transfers the alignment of a rotating table or plate or any other element which, in the case of a vertical tower is on or near ground level, to another rotatable element at the top of the tower. The transfer is by means of two light sources on the lower rotatable element which produce beams of light that are inclined inwardly and meet in a plane near the top of the tower. The beams are sharply imaged in this plane in a single spot when azimuth alignment is correct as will be described below. In the plane where the beams meet there is a reticle provided with a suitable pattern of transparent and opaque segments which are radially disposed and normally of a uniform pattern spacing. Each beam is thus interrupted or chopped at predetermined frequencies. The two beams pass beyond the reticle plane through a conventional field lens onto two radiation detectors which transform their energy into A.C. electrical signals. The lenses, reticle and detectors are mounted to be rotatable about the optic axis of the system which is aligned approximately through the center of rotation of the lower azimuth transfer element. Connected thereto and rotating therewith is a table or other support on which an instrument is attached, the azimuth orientation of which is of importance.

The radiation sources and the detectors may be of any type. For most operations because of convenience, great sensivity and low cost, visible light sources and visible light detectors such as phototubes present much advantage and where there is no objection to their use they constitute the preferred radiation to be used. It should be understood, however, that the invention is no sense limited to the used of visible light. Any radiations which have a wavelength short enough to obey optical laws, and which will be referred to throughout the specification and claims as "optical radiations" may be used. In fact under certain circumstances such as those involving military operations it is sometimes undesirable to have any visible light in evidence and for such uses infrared radiation may be employed. The operation of the invention is exactly the same but, of course, the optical elements, radiation detectors and reticle rotational speed must be adapted to the characteristics of the radiation used. These adaptations are conventional and the invention does not use any particular optical design for one radiation rather than another.

The electrical signals from the detectors can be used to detect with extraordinary precision displacements of the images on the reticle due to minute azimuth differences caused by rotation of the azimuth element on the ground.

The preferred method of distinguishing image movement due to rotation involves conventional electronic circuits in which the signals from the two radiation detectors are connected out of phase, electronic systems including limiters which maintain the electrical output from each detector constant and a sensitive phase detection circuit producing a final output which is proportional to changes in phase due to relative movement of the images on the reticle plane as a result of azimuth mismatch. It is an advantage of the present invention that ampliying, limiting circuits and phase detection circuits are of conventional electronic design. In the preferred embodiment of the invention these circuits are necessary but their particular electronic design is not. Accordingly, in the more detailed description to follow the electronic circuits will be shown in block diagrammatic form. The output signal, which is zero when the images of the beams are coincidental and have the signals from the two detectors exactly cancel, can be used for any normal purpose for which error signals are employed in electronic instruments. They may be used for measurement, recording or through conventional servo loops to rotate the table and assembly at the top of the tower until there is an exact azimuth alignment with the element on the ground. For most purposes this correction by servo system is a desirable feature. The mechanisms used, however, are purely conventional and as such form no part of the present invention. Another way of putting it is that the present invention ceases with the output error signal which can then be used in any conventional or suitable manner.

The present invention has many fields of utility, for example, at the top of the tower an autocollimator or similar alignment device may be mounted on the rotatable table and used for initial alignment of missiles or other devices which require a precise alignment of elements located a considerable distance from the ground. Another important field of utility lies in precision, locating and monitoring radio antennae. Normally such monitoring and locating antennae have to be at a considerable height from the ground, in other words, at the top of a rather tall tower. Precise alignment with an element on the ground is necessary in spite of the fact that the top of the tower may be swayed considerably by winds or moved translationally by other forces. Other instances where precise azimuth alignment is necessary at a distance involve astronomical telescopes and other sighting devices. In general, the present invention is not directly concerned with why the upper azimuth element has to be accurately rotationally aligned with the lower one.

The invention will be described in greater detail in conjunction with the drawings in which:

FIG. 4 is a block diagram of the electronic circuits, and

FIG. 5 is a representation of output signal.

Figure 1:
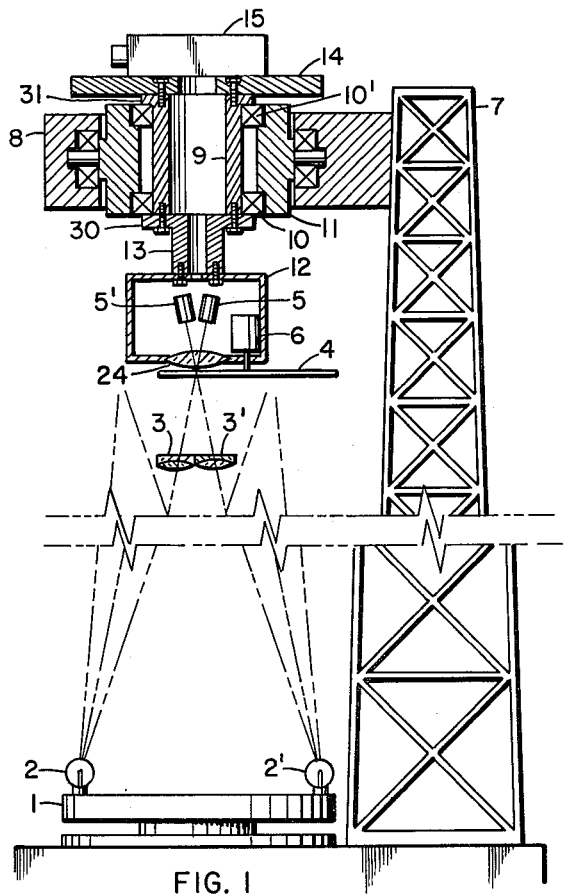
FIG. 1 is a side elevation, partly in section of a typical installation.

In FIG. 1 there is shown a lower azimuth table 1 at ground level provided with two sources of light 2 and 2' shine through imaging lenses 3 and 3' and are imaged on a point on a reticle 4 which is driven by a motor 6. After passing through the reticle plane the two beams pass through a field lens 24 and strike detectors 5 and 5'.

The upper end of the tower 7 carries a platform 8 with a central opening in which is mounted an inner framework 11 provided with a shaft 9 which turns in bearings 10 and 10' on the platform 8. In the framework 11 there is a shaft 13 which connects a framework 12, to which lenses, rotating light interrupting reticle and light detectors are rigidly mounted on an upper table 14 on which there is mounted an autocollimator 15. The shaft 13 is provided with a flange 30 which bears on the bearings 10. Similarly the shaft 9 is provided with a flange 31 which bears on the bearings 10' and which also serves as a spacer between the rotatable table 14 and the framework 11 and hence also the platform 8. The framework 12, shaft 13, shaft 9 and the table 14 are bolted together to form a rigid assembly which is free to turn on the bearings 10 and 10'. The autocollimator is purely for illustrative purposes and can be replaced with any other device the azimuth of which is to be controlled accurately.

Figure 2:
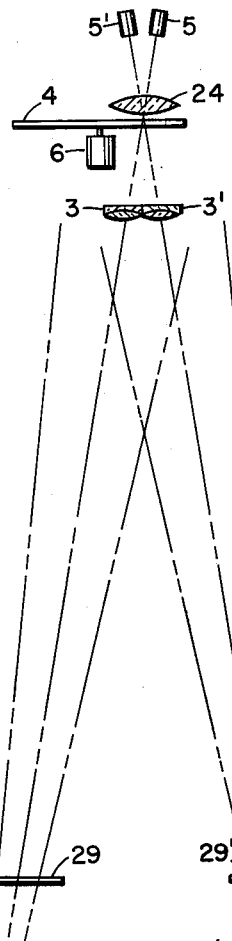
FIG. 2 is a diagram of the optical system.

The optical arrangement in FIG. 1 is shown in very crude form, with the light sources being illustrated as lamps. FIG. 2 shows the optical system in more detail and with greater refinement. The same elements bear the same reference numerals. Instead of two light bulbs on the table 1 there is provided a single light source 19 with a ribbon filament the light from which passes through lenses 17 and 17' and strikes inclined plane mirrors 18 and 18'. Located in the two resultant beams between lenses and mirrors are two slits 28 and 28' on which the light source is imaged by the lenses 17 and 17'. Beyond the slits are provided adjustable tilt plates 29 and 29' for superposing the images on the reticle.

Figure 3:
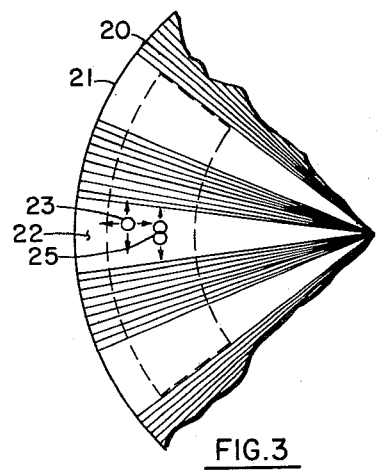
FIG. 3 is a plan view of the reticle.

The reticle itself is shown in FIG. 3 and comprises a large number of alternate opaque bars and clear spaces, for example 500 of each. The bars are arranged in ten groups. Each group is further subdivided with 25 narrow bars and wide clear spaces followed by 25 wider bars and narrower clear spaces, the total width of an adjacent bar and space being constant. This results in a second and lower frequency of beam interruption namely one-fiftieth that of the main frequency. As will be described below this lower frequency is used to extend the degree of azimuth rotation which can be covered by the present instrument. In the drawings a much smaller number of bars and clear spaces are shown for the sake of clarity and only part of one group is shown as the difference in relative widths is too small to show clearly on a drawing. The total number of bars is not important but depends on the relative speed of the driving motor for the reticle and on the frequency with which the light beams are to be chopped which in turn depends on the nature of the radiation used and the detectors employed. The opaque and clear bars are numbered 20 and 21 respectively. At 22 the images of the light source in the two beams are shown approximately centrally located in the clear space and exactly coincident. This is a situation when there is a perfect azimuth match. As the reticle rotates the two beams are chopped at exactly the same time and so the chopping of light on the two detectors is exactly in phase.

Let us now assume that the top of the tower has bent resulting in a translational movement to the right in FIGS. 1 and 2. This will result in the images of the two beams being moved nearer the periphery of the reticle. The situation is shown at 23 and four arrows indicate movement of the image with translational motions of the framework 12 in either direction. In other words, as the top of the tower sways the two images move but they move exactly together. This does not affect the illumination of the detectors 5 and 5' because of the field lens 24. The illumination of the two detectors is, therefore, chopped in exactly the same phase regardless of swaying of the top of the tower.

Now let us consider the situation that occurs if either the element 1, or the table 14 and associated framework 12, turn with respect to each other. This rotation will result in the images of the two beams being slightly displaced sideways relative to each other. This is shown at 25 in FIG. 3. Again the field lens 24 provides the same illumination for each detector 5 and 5' but now the phase of the interrupted light on the two detectors will be slightly different by the displacement of the two images at 25. The effect of this displacement will be brought out in a description of FIG. 4. In this figure the two detectors 5 and 5' feed their signals to amplifiers and limiters 26 and 26'. Each signal is amplified and is then limited so that the resulting output signal is in the same phase as the input signal but does not change in amplitude. This takes care of changes in detector sensitivity, light intensity or any other conditions which could give rise to a spurious indication of the instrument.

The outputs from the amplifiers and limiters 26 and 26' are added in opposing phases and fed into a sensitive phase detector circuit 27. If the upper elements and the lower element 1 show the same azimuth the light on the two detectors 5 and 5' will be chopped in exactly the same phase on each and since the signals from each detector after amplifying and limiting are added 180° out of phase there is no net output signal into the phase detector. If the top of the tower sways the translational movement moves the two images, as is shown at 22 in FIG. 3, but they still are interrupted in the same phase and, therefore, the zero signal will still be obtained regardless of translational movements of the top of the tower. If, however, there is a rotational difference between the upper element and the lower element 1 then the two images will be displaced as shown at 25 and the interruption of the two beams will not be at exactly the same times. Putting it another way the phases of the interruption of light and hence of the signals from the two detectors 5 and 5' will be different. After amplification and limitation the signals going into the phase detector are no longer exactly 180° out of phase and, therefore, do not cancel. A residual error signal is produced, the phase of which is determined by the relative azimuth of the two elements. This error signal can be used in any manner desired, and can go to a motor of a conventitonal servo (not shown) which moves the upper table 14 through precise gearing. The motor, of course, is connetced to rotate the table 14 in a direction to restore azimuth alignment. As soon as this has occurred no error signal results and the motor stops. It should be noted that the response is proportional so that the motor drive slows down as the null point is reached which minimizes hunting.

In FIG. 3 the two images are shown displaced by a considerable amount at 25. Actually the sensitivity of the instrument is so great that rotation of as little as one second of arc can be determined under favorable circumstances. This corresponds to displacement of the images in some cases of as little as a micron. FIG. 3, therefore, shows an enormously exaggerated displacement for sake of clearness.

The electronic processing circuits are shown in block diagram form in FIG. 4. The outputs of the two detectors 5 and 5' are connected to the two signal limiter amplifiers 26 and 26', also designated "SLA." A portion of the output of each amplifier is passed through low pass filters designated "LP filters" which pass signals at the low frequency produced by the fact that the different groups of bars and spaces have different relative bar and space dimensions. The outputs from the two signal limiter amplifiers are also connected to two ends of a resistance network designated "Fine Adder," where they are added and the resulting signal passed to a fine phase detector. This phase detector also receives directly amplified signal from detector 5' which provides a comparison phase reference. The outputs of the two low pass filters are similarly connected to a resistance network refererd to as "Coarse Adder" the output of which goes to a coarse phase detector. This receives signal from detector 5' this time both amplified in the signal limiter amplifier and filtered by the low pass filter so that it contains only the low frequency signal. The outputs from the two phase detectors are then passed through a fine and coarse combining network to produce a final output.

In the combining network there is present a relay which is triggered by the signal from the coarse phase detector when it reaches a certain predetermined value. This relay connects a fixed voltage approximating the limited value of the voltage from the fine phase detector output. As a result the final output remains at a fixed voltage until the output from the coarse phase detector has dropped below the value which triggers the relay which, as illustrated in FIG. 5, occurs at approximately 50° rotation. The relay may be electromechanical or all electronic. The circuits used follow standard design and are, therefore, not shown in detail.

FIG. 5 shows the output signal plotted against relative rotation of the lower azimuth table 1 and the upper table 14. It will be seen that if the fine channel output, that is to say, the output of the fine phase detector were used alone it would produce an error signal up to 30' of relative rotation and this would then drop off. When, however, the coarse or low frequency output, which is shown by dash and dot lines, is added, the error signal is maintained constant out to a much greater relative rotation. The addition of the coarse low frequency signal while not essential to the operation of the instrument of the present invention is preferred because it extends the range of relative rotation over which corrective error signals are developed. It will also be noted that the coarse signal is not critical, it could close the relay anywhere between 15' and 45' without affecting accuracy.

For the greatest precision the frame 11 is mounted in gimbals, as shown in FIG. 1. It is desirable to maintain the table 14 and hence the framework 12 carrying the optics reasonably level because while translational movements due to the swaying of the top of the tower, even of very large magnitude, affect the measurement and accuracy of the instrument not at all tilt does have a small effect and, therefore, for maximum precision leveling is desirable.

In the drawings the light source is shown on the lower table and the detectors on the upper. The operation of the instrument is nowise affected if these two elements are interchanged. All that is necessary is that one table carries sources of the two light beams, and the other table carries the reticle and detectors. Theoretically the axis about which the two light sources rotate, which does not necessarily coincide with the rotational axis of the table, could be far removed translationally from the axis of the upper table to which the detectors are connected. However, in such a case a very large reticle would be needed so that the translational effect would not move the beams off the reticle. For practical operation with the desirable fairly small reticles there is a limit to the separation of the axis of rotation of the upper and lower elements. For practical operation, therefore, the axis should approximate coincidence sufficiently closely so that the beams will still pass through the reticle.

I claim:
1. An azimuth transfer system comprising in combination and in optical alignment,
   (a) first and second relatively rotatable elements,
   (b) means for separating the elements by a relatively long distance, means for maintaining the two elements at least roughly parallel to each other and with approximately coincident centers,
   (c) two linearly separated sources of radiation on the first element at least a portion of the radiation producing two convergent beams,
   (d) a reticle having opaque and transparent spokes, means for rotating the reticle and for maintaining its plane substantially parallel to the second element,
   (e) two radiation detectors,
   (f) means for imaging the beams from the two radiation sources onto a spot in the plane of the recticle and
   (g) means, acting as a field lens, illuminating the detectors from each beam respectively, the beam imaging means and field lens means being rigidly connected to the second element,
   (h) amplifying circuits producing output signals, means for applying electric signals from said radiation detectors to said circuits,
   (i) at least one phase sensitive detector circuit and means for connecting the outputs of the amplifiers in said phase sensitive detector to produce an output signal proportional to relative phase of the two detector outputs.

2. A device according to claim 1 in which the two radiation sources are mirrors linearly displaced on the first element and illuminated by beams produced from a single central radiation source and means for producing two beams from said source, slits in said beams intermediate the radiation source and the mirrors the slits being located so that the radiation source is imaged onto each slit.

3. A device according to claim 1 in which the two elements are connected to the ends of an imperfectly rigid tower structure.

4. A device according to claim 1 in which both the first and second elements are independently rotatable.

No references cited.